(12) United States Patent
Kim

(10) Patent No.: US 7,812,834 B2
(45) Date of Patent: Oct. 12, 2010

(54) DC STABILIZATION CIRCUIT FOR ORGANIC ELECTROLUMINESCENT DISPLAY DEVICE AND POWER SUPPLY USING THE SAME

(75) Inventor: Hyeong-Gwon Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 989 days.

(21) Appl. No.: 11/412,356

(22) Filed: Apr. 26, 2006

(65) Prior Publication Data

US 2006/0245521 A1    Nov. 2, 2006

(30) Foreign Application Priority Data

Apr. 29, 2005   (KR) .................. 10-2005-0036391

(51) Int. Cl.
G09G 5/00 (2006.01)
(52) U.S. Cl. .................. 345/211; 345/212; 323/312; 323/315; 327/52; 327/53
(58) Field of Classification Search ............ 345/211, 345/212, 76; 323/315, 304, 311, 312; 315/160–176, 315/291; 327/53
See application file for complete search history.

(56) References Cited

U.S. PATENT DOCUMENTS

| | | | | | |
|---|---|---|---|---|---|
| 4,241,294 | A | * | 12/1980 | Fisler | 315/291 |
| 4,570,115 | A | * | 2/1986 | Misawa et al. | 323/313 |
| 5,089,810 | A | * | 2/1992 | Shapiro et al. | 345/88 |
| 5,517,212 | A | * | 5/1996 | Inoue | 345/211 |
| 5,583,528 | A | * | 12/1996 | Ebihara | 345/58 |
| 5,625,387 | A | * | 4/1997 | Moon | 345/211 |
| 5,793,342 | A | * | 8/1998 | Rhoads | 345/76 |
| 5,798,741 | A | * | 8/1998 | Kajihara | 345/94 |
| 5,831,605 | A | * | 11/1998 | Yasui et al. | 345/211 |
| 6,275,209 | B1 | * | 8/2001 | Yamamoto | 345/95 |
| 6,496,175 | B1 | * | 12/2002 | Fukuo | 345/99 |
| 7,079,127 | B2 | * | 7/2006 | Morita | 345/212 |
| 2004/0145583 | A1 | * | 7/2004 | Morita | 345/211 |

FOREIGN PATENT DOCUMENTS

KR          0144590         4/1998

OTHER PUBLICATIONS

Korean Patent Abstracts, Publication No. 100144590 B1; Publication Date: Apr. 21, 1998; in the name of Kwon.
Office Action for corresponding Korean Patent Application No. 10-2005-0036391 dated Sep. 25, 2006.

* cited by examiner

*Primary Examiner*—Amare Mengistu
*Assistant Examiner*—Koosha Sharifi
(74) *Attorney, Agent, or Firm*—Christie, Parker & Hale, LLP

(57) ABSTRACT

A DC stabilization circuit for an organic electroluminescent display device and a power supply using the same are provided. The DC stabilization circuit includes a self-bias part connected between a first power supply voltage and a reference power supply. The self-bias part generates a bias voltage depending on the first power supply voltage. The circuit also includes a differential part connected to the self-bias part that amplifies a variation in the bias voltage. A negative feedback part is connected to the differential part, adjusts a level of a second power supply voltage using a variable resistor, and compensates for the amplified variation of the bias voltage through a negative feedback operation.

16 Claims, 5 Drawing Sheets

DC STABILIZATION CIRCUIT FOR ORGANIC ELECTROLUMINESCENT DISPLAY DEVICE AND POWER SUPPLY USING THE SAME

CROSS-REFERENCE TO RELATED APPLICATION

This application claims priority to and the benefit of Korean Patent Application No. 10-2005-0036391, filed Apr. 29, 2005, the entire content of which is incorporated in its entirety herein by reference.

BACKGROUND OF THE INVENTION

1. Field of the Invention

The present invention relates to a direct current (DC) stabilization circuit for an organic electroluminescent display device (e.g., organic light emitting diode display device) and a power supply using the same, and more particularly, to a DC stabilization circuit for an organic electroluminescent display device and a power supply using the same in which noise included in DC voltage can be removed.

2. Description of the Related Art

Unlike a passive matrix organic electroluminescent display device, an active matrix organic electroluminescent display device is provided with a thin film transistor for each pixel. Further, a positive power supply voltage (ELVDD) and a negative power supply voltage (ELVSS) are applied to the pixel having the thin film transistor. In particular, the positive power supply voltage is connected to a driving transistor generating a driving current.

The driving current generated by the driving transistor depends on a voltage difference Vsg between a source and a gate of the driving transistor. In addition, the driving transistor is connected to the positive power supply voltage so that the voltage difference Vsg of the driving transistor is directly affected by the positive power supply voltage. Thus, in the case where the positive power supply voltage does not continuously maintain a predetermined level due to noise or the like, the driving current generated by the driving transistor varies irregularly even though the same data signal is applied to the driving transistor.

FIG. 1 is a block diagram of a conventional power supply.

Referring to FIG. 1, the power supply includes a regulator circuit 100 receiving a first power supply voltage applied from an input power supply, and a variable resistor 150 for adjusting an output level of a second power supply voltage output from the regulator circuit 100.

By controlling the variable resistor 150, the second power supply voltage output from the regulator circuit 100 is adjusted to a predetermined level. Further, the first power supply voltage is directly applied from an external power supply or applied via an adapter. The adapter converts the power received from the external source into a power supply voltage having a plurality of levels.

The second power supply voltage output from the regulator circuit 100 acts as the positive power supply voltage of the organic electroluminescent display device. The regulator circuit 100 may be a series regulator, a switching regulator, or the like.

While the series regulator has disadvantages of low power efficiency and high heat generation, the switching regulator has advantages of high power efficiency and low heat generation compared with the series regulator. However, the switching regulator causes a ripple in an output signal because of noise generated in a switching operation.

When the first power supply voltage applied to the regulator circuit 100 includes the noise, the output level of the regulator circuit 100 cannot maintain a stable DC value. That is, when the second power supply voltage including the ripple is output, the driving current for the organic electroluminescent display device, depending on the positive power supply voltage, has an unwanted value so that a gray scale corresponding to the applied data signal cannot be accurately displayed.

SUMMARY OF THE INVENTION

Some embodiments of the present invention provide a DC stabilization circuit for an organic electroluminescent display device that is capable of obtaining a stable output value.

Embodiments of the present invention also provide a power supply for an organic electroluminescent display device and an organic electroluminescent display device employing the DC stabilization circuit.

In an exemplary embodiment of the present invention, a DC stabilization circuit for an organic electroluminescent display device includes: a self-bias part connected between a first power supply voltage and a reference power supply for generating a bias voltage depending on the first power supply voltage; a differential part connected to the self-bias part for amplifying a variation in the bias voltage; and a negative feedback part connected to the differential part, for adjusting a level of a second power supply voltage using a variable resistor, and for compensating for the amplified variation of the bias voltage through a negative feedback operation.

In another exemplary embodiment of the present invention, a power supply for an organic electroluminescent display device includes: a regulator circuit for receiving an input power supply voltage and for outputting a first power supply voltage having a first level; and a DC stabilization circuit connected to the regulator circuit, for adjusting the level of the received first power supply voltage by a negative feedback operation, and for outputting a second power supply voltage having a second level lower than the first level. The DC stabilization circuit includes: a self-bias part having a first resistor and a second resistor, which are connected between the first power supply voltage and a reference power supply, for generating a bias voltage depending on the first power supply voltage; a differential part connected to the self-bias part for amplifying a variation in the bias voltage; and a negative feedback part connected to the differential part, for adjusting a level of a second power supply voltage using a variable resistor, and for compensating for the amplified variation of the bias voltage through a negative feedback operation.

In another exemplary embodiment of the invention, an electroluminescent display device includes the above power supply connected to at least one pixel circuit.

BRIEF DESCRIPTION OF THE DRAWINGS

The above and other features and aspects of the present invention will become more apparent by describing certain exemplary embodiments thereof with reference to the attached drawings in which.

DETAILED DESCRIPTION

Hereinafter, exemplary embodiments of the present invention will be described with reference to the accompanying drawings.

Figure 1:
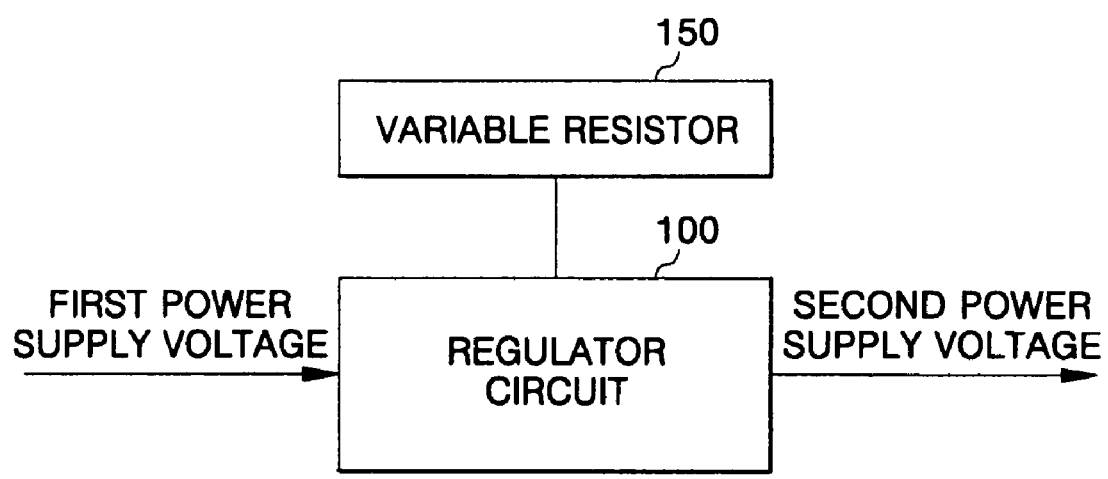
FIG. 1 is a block diagram of a conventional power supply.
Figure 2:
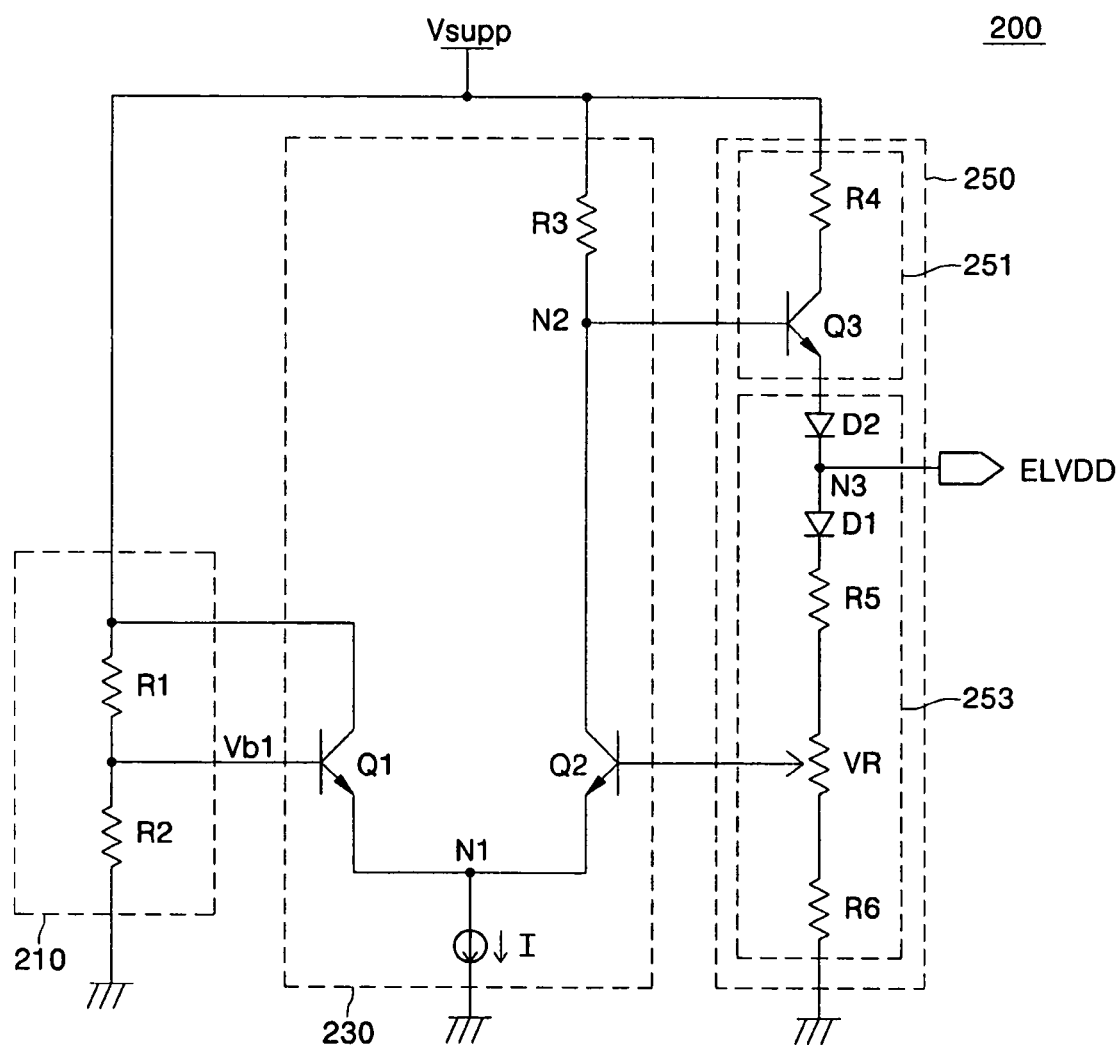
FIG. 2 is a circuit diagram of a DC stabilization circuit for an organic electroluminescent display device according to an exemplary embodiment of the present invention.

FIG. 2 is circuit diagram of a DC stabilization circuit for an organic electroluminescent display device according to an exemplary embodiment of the present invention.

Referring to FIG. 2, a DC stabilization circuit 200 includes a self-bias part 210, a differential part 230, and a negative feedback part 250.

The self-bias part 210 is connected between a first power supply voltage Vsupp and a reference power supply. In addition, the self-bias part 210 supplies a bias voltage Vb1 needed during normal operation of the differential part 230. The self-bias part 210, in this embodiment, includes two resistors R1 and R2, which are connected in series. The first resistor R1 is connected between the first power supply voltage Vsupp and the differential part 230, and the second resistor R2 is connected between the first resistor R1 and the reference power supply.

Therefore, the bias voltage Vb1 applied to the differential part 230 is given by the following Equation 1:

$Vb1 = Vsupp * R2/(R1+R2)$ [Equation 1]

The differential part 230 includes a first transistor Q1 and a second transistor Q2, which form a pair. Further, the differential part 230 includes a constant current source connected between the reference power supply and a first node N1 to which an emitter of the first transistor Q1 and an emitter of the second transistor Q2 are commonly connected. Also, the differential part 230 includes a third resistor R3 connected between a collector of the second transistor Q2 and the first power supply voltage Vsupp.

This exemplary embodiment is described assuming that all transistors are bipolar transistors, but the invention is not limited to this embodiment. Alternatively, the transistors may be MOS transistors.

A base of the first transistor Q1 is connected to the first resistor R1 and the second resistor R2 of the self-bias part 210, and the bias voltage Vb1 is applied to the base of the first transistor Q1. The emitter of the first transistor Q1 is also connected to the first node N1, and the first power supply voltage Vsupp is applied to the collector of the first transistor Q1.

The second transistor Q2 is arranged in a pair together with the first transistor Q1. That is, the emitter of the second transistor Q2 connected to the first node N1 is electrically connected to the emitter of the first transistor Q1. Further, the base of the second transistor Q2 is connected to the negative feedback part 250, and the collector of the second transistor Q2 is connected to a second node N2.

The constant current source is connected between the first node N1 and the reference power supply. Therefore, the first node N1 is connected to the emitter of the first transistor Q1, the emitter of the second transistor Q2, and the constant current source.

The third resistor R3 is connected between the first power supply voltage Vsupp and the second node N2. Further, the third resistor R3 acts as an output resistor of the second transistor Q2.

The negative feedback part 250 includes an emitter follower 251 and a voltage converter 253.

The emitter follower 251 includes the third transistor Q3 and a fourth resistor R4. A base of the third transistor Q3 is connected to the second node N2, and an emitter of the third transistor Q3 is connected to the third node N3. The third node N3 is an output terminal of the DC stabilization circuit 200 and outputs the second power supply voltage ELVDD. A collector of the third transistor Q3 is connected to the fourth resistor R4. The fourth resistor R4 is connected between the first power supply voltage Vsupp and the collector of the third transistor Q3 and determines a quiescent operating point of the third transistor Q3.

The collector of the third transistor Q3 is connected to the first power supply voltage Vsupp via the fourth resistor R4, and the emitter of the third transistor Q3 outputs an output signal. The small signal voltage gain of the third transistor Q3 is substantially 1.

The voltage converter 253 is connected between the third node N3 and the reference power supply. The voltage converter 253 has a fifth resistor R5 connected to the third node N3, a variable resistor VR serially connected to the fifth resistor R5, and a sixth resistor R6 connected between the variable resistor VR and the reference power supply. In addition, the base of the second transistor Q2 is connected to the variable resistor VR. In order to prevent a reverse current from the fifth resistor R5 to the third node N3, a first diode (not shown) may be interposed between the third node N3 and the fifth resistor R5 to act as a rectifier. In addition, a second diode (not shown) for preventing a reverse current may be interposed between the third node N3 and the output terminal outputting the second power supply voltage ELVDD.

An output level of the DC stabilization circuit according to this exemplary embodiment of the present invention is changed by adjusting the variable resistor VR. That is, as the variable resistor VR is adjusted, a voltage level applied to the base of the second transistor Q2 is changed. By variation of the voltage level, a current flowing through the collector and the emitter of the second transistor Q2 is changed.

Therefore, the voltage of the second node N2 applied to the base of the third transistor Q3 is changed. The voltage change of the second node N2 is accompanied by change in the level of the second power supply voltage ELVDD of the third node N3, which is the output terminal of the DC stabilization circuit 200. That is, by adjusting a resistance of the variable resistor VR, the output level of the DC stabilization circuit 200 can be changed. The resistance of the variable resistor VR required to obtain a desired output signal level is the median value of the variable range of the variable resistor VR.

The second power supply voltage ELVDD determined by the variable resistor VR is used as the positive power supply voltage ELVDD of the organic electroluminescent display device. In the DC stabilization circuit 200 according to this exemplary embodiment of the present invention, the level of the positive power supply voltage ELVDD applied to pixels included in the organic electroluminescent display device may be adjusted by adjusting the variable resistor VR. Particularly, if the panel size of the organic electroluminescent display device increases, the positive power supply voltage ELVDD changes according to position of pixels on the panel, which may cause the characteristics of pixels to be non-uniform.

Thus, the level of the positive power supply voltage ELVDD applied to each pixel is adjusted using the variable resistor VR. That is, the level of the positive power supply voltage ELVDD applied to each pixel may be changed respectively, and in one exemplary embodiment, the level of the positive power supply voltage ELVDD commonly applied to red, green, and blue color pixels may be changed.

Figure 3:
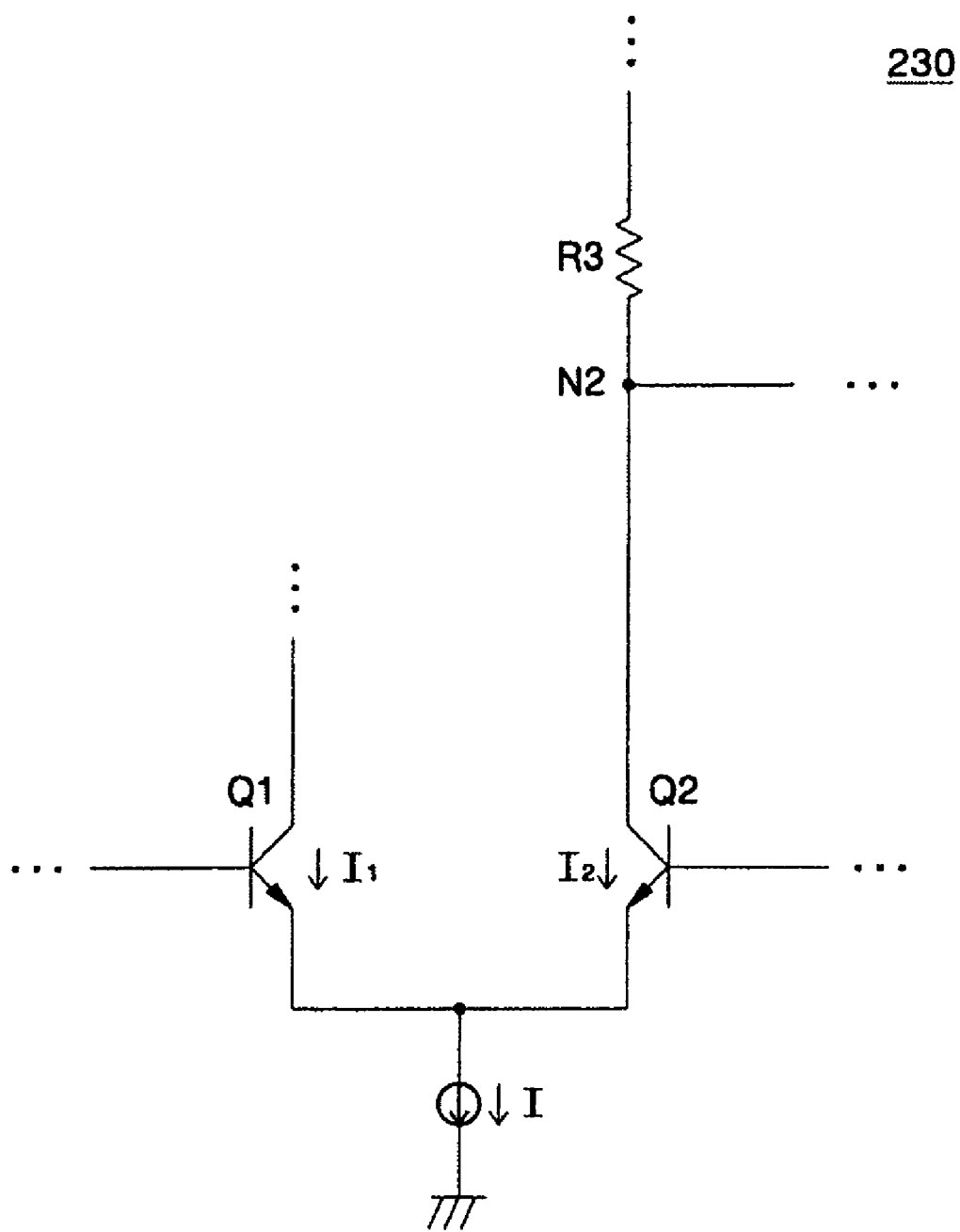
FIG. 3 is a circuit diagram of a differential part of the DC stabilization circuit according to the embodiment shown in FIG. 2.

Referring to FIG. 3, when the first power supply voltage Vsupp has a ripple, the level of the first power supply voltage Vsupp suddenly rises or drops. When the level of the first power supply voltage Vsupp rises, the bias voltage Vb1 applied to the base of the first transistor Q1, which is commonly connected to a terminal connected to the first resistor R1 and the second resistor R2 of the self-bias part 210, increases.

By the rise of the bias voltage Vb1 applied to the base of the first transistor Q1, a small signal current is generated from the emitter of the first transistor Q1. That is, a current I1 flowing from the collector of the first transistor Q1 to the emitter of the first transistor Q1 increases. Further, as the first node N1 is connected to the constant current source, a current I2 flowing from the collector of the second transistor Q2 to the emitter of the second transistor Q2 decreases. That is, since the current I flowing through the constant current source is I1+I2, the increase of I1 causes I2 to decrease. In terms of the small signal analysis, it is interpreted that the second transistor Q2 receives the small signal generated by the first transistor Q1. Also, the small signal current passed through the second transistor Q2 is represented as a variation in voltage through the third resistor R3. That is, when the current I2 flowing through the second transistor Q2 decreases, the voltage of the second node N2 increases.

On the other hand, when the level of the first power supply voltage Vsupp drops, the bias voltage Vb1 applied to the base of the first transistor Q1, which is commonly connected to a terminal connected to the first resistor R1 and the second resistor R2 of the self-bias part 210, decreases.

By the drop of the bias voltage Vb1 applied to the base of the first transistor Q1, a small signal current is generated from the emitter of the first transistor Q1. That is, a current I1 flowing from the collector of the first transistor Q1 to the emitter of the first transistor Q1 decreases. Further, as the first node N1 is connected to the constant current source, a current I2 flowing from the collector of the second transistor Q2 to the emitter of the second transistor Q2 increases. That is, since the current I flowing through the constant current source is I1+I2, the decrease of I1 causes I2 to increase. When the current I2 flowing through the second transistor Q2 increases, a voltage drop in the third resistor R3 increases and the voltage of the second node N2 decreases.

Figure 4:
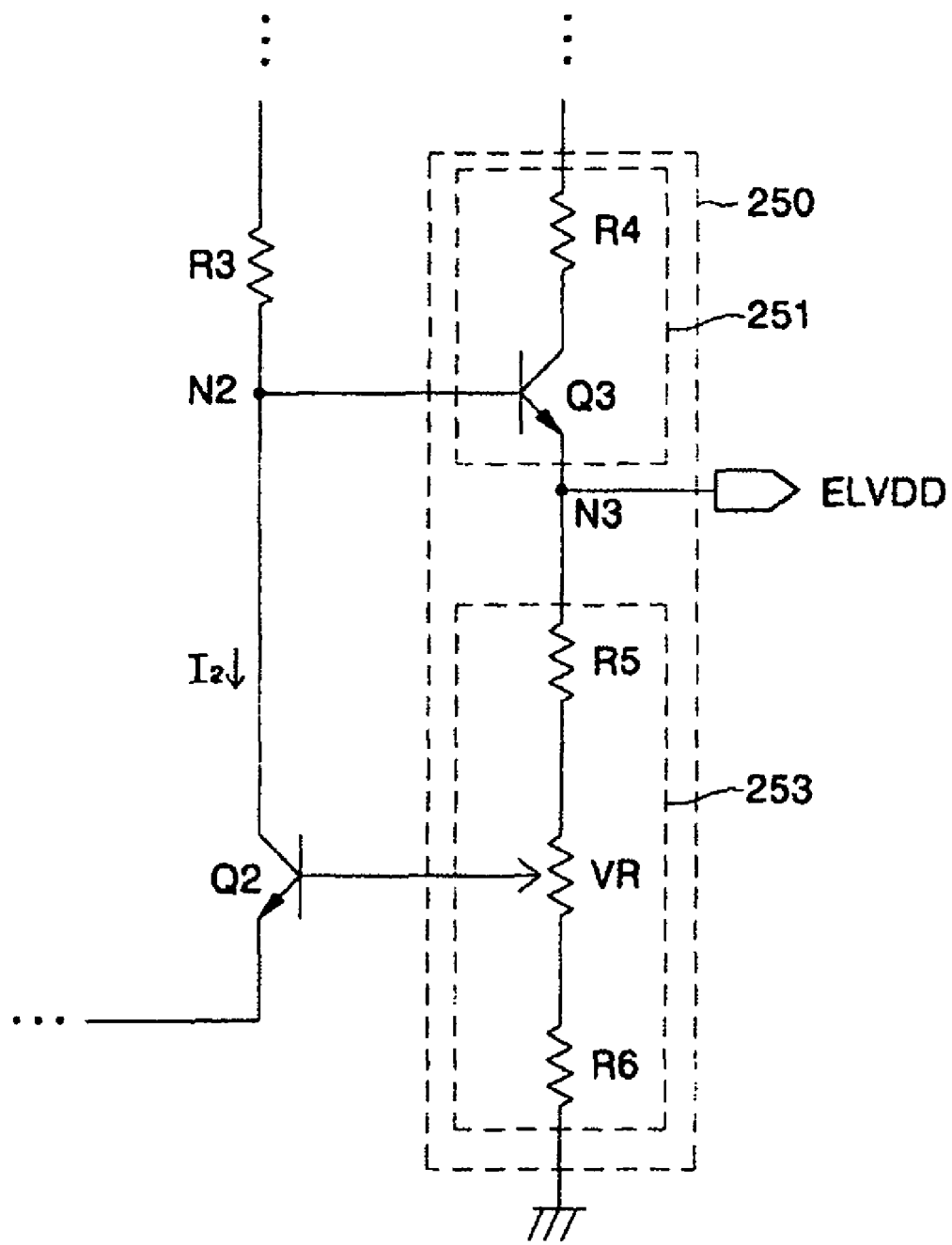
FIG. 4 is a circuit diagram of a negative feedback part according to the embodiment shown in FIG. 2.

Referring to FIG. 4, when the current I2 flowing through the second transistor Q2 decreases, the voltage level of the second node N2 increases. The voltage level increase of the second node N2 results from the rise of the first power supply voltage Vsupp and the voltage drop due to the drop of the current I2 flowing through the third resistor R3.

When the voltage level of the second node N2 rises, the voltage level of the third node N3 adjacent to the third transistor Q3 with an emitter follower structure rises. Therefore, a current flowing through the variable resistor VR of the voltage converter 253 increases, which results in the increase of a voltage of the base of the second transistor Q2.

However, since the current I2 flowing from the collector of the second transistor Q2 to the emitter of the second transistor Q2 should decrease, the voltage of the base of the second transistor Q2 should drop substantially. That is, the operation to decrease the current I2 through the second transistor Q2, and the operation to raise the voltage of the third node N3 through the third transistor Q3 compensate for each other, thereby minimizing variation in the second power supply voltage ELVDD at the third node N3.

In other words, a negative feedback operation is performed by the second transistor Q2, the second node N2, the third transistor Q3, and the voltage converter 253, so that the output of the DC stabilization circuit is maintained at a constant level or a substantially constant level.

Referring to FIGS. 2-4, when a voltage level of the first power supply voltage Vsupp drops suddenly, the current I1 flowing from the collector of the first transistor Q1 to the emitter of the first transistor Q1 decreases, and the current I2 flowing from the collector of the second transistor Q2 to the emitter of the second transistor Q2 increases. The voltage level of the second node N2 drops due to the increase of the current I2 flowing through the second transistor Q2. The voltage level decrease of the second node N2 results from the drop of the first power supply voltage Vsupp and the voltage drop due to the increase of the current I2 flowing through the third resistor R3.

When the voltage level of the second node N2 drops, the voltage level of the third node N3 adjacent to the third transistor Q3 with an emitter follower structure drops. Therefore, a current flowing through the variable resistor VR of the voltage converter 253 decreases, which results in decrease of the voltage of the base of the second transistor Q2.

However, since the current I2 flowing from the collector of the second transistor Q2 to the emitter of the second transistor Q2 should increase, the voltage of the base of the second transistor Q2 should rise substantially. That is, the operation to increase the current I2 flowing through the second transistor Q2 and the operation to drop the voltage of the third node N3 through the third transistor Q3 compensate for each other, thereby minimizing variation in voltage at the third node N3.

In other words, a negative feedback operation is performed by the second transistor Q2, the second node N2, the third transistor Q3, and the voltage converter 253, so that the output of the DC stabilization circuit is maintained at a constant level or a substantially constant level.

Figure 5:
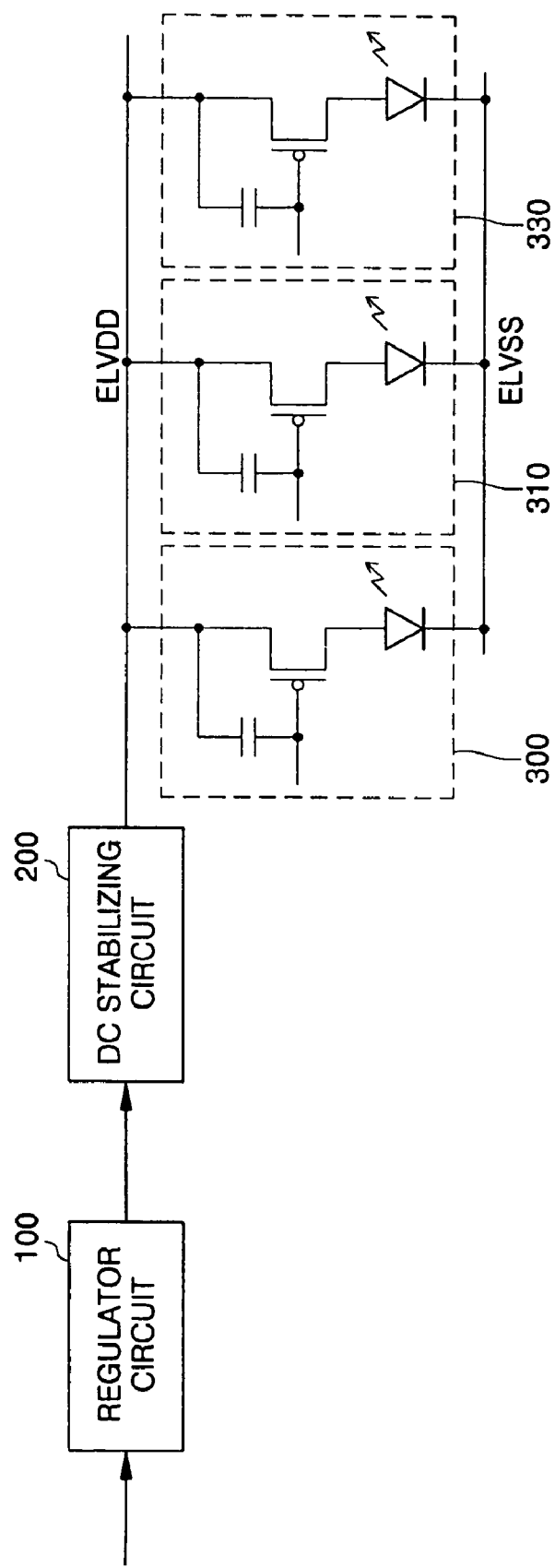
FIG. 5 is block diagram showing a power supply for an organic electroluminescent display device coupled to a pixel circuit according to an exemplary embodiment of the present invention.

FIG. 5 is a block diagram of a power supply for an organic electroluminescent display device according to an exemplary embodiment of the present invention.

Referring to FIG. 5, the organic electroluminescent display device according to the exemplary embodiment of the present invention includes a regulator circuit 100 and a DC stabilization circuit 200.

The regulator circuit 100 receives an input power supply voltage and outputs a first power supply voltage having a first level. In addition, the input power supply voltage is directly applied from an external power supply or applied using an adapter provided in the organic electroluminescent display device. The adapter converts power received from the external power supply into a power voltage having a plurality of levels. In addition, the regulator circuit 100 may be a series regulator, a switching regulator, or the like.

The first power supply voltage output from the regulator circuit 100 is applied to the DC stabilization circuit 200. The DC stabilization circuit 200 has the same configuration and operation as that described above with reference to FIGS. 2 to 4. Thus, the DC stabilization circuit 200 removes ripple or noise from the first power supply voltage and outputs a second power supply voltage having a second level lower than the first level.

The second power supply voltage becomes ELVDD, required to drive pixels included in the organic electroluminescent display device. Also, the second power supply voltage, as shown in FIG. 5, may be commonly applied to an R pixel 300, a G pixel 310, and a B pixel 330, or may be applied to each of the R pixel 300, G pixel 310, and B pixel 330 separately.

Therefore, the DC stabilization circuit according to the described embodiments of the present invention removes ripple or noise contained in the first power supply voltage which is the output of the regulator circuit, and enables adjustment of the output level through the variable resistor.

As described above, various embodiments of the present invention provide a DC stabilization circuit for adjusting a level of a power supply voltage applied through a negative feedback part connected to a differential part, and minimizing variation in power supply voltage applied thereto.

Although the present invention has been described with reference to certain exemplary embodiments thereof, it will be understood by those skilled in the art that various modifications may be made to the present invention without departing from the spirit and scope of the present invention defined by the appended claims and their equivalents.

What is claimed is:

1. A DC stabilization circuit comprising:
   a self-bias part connected between a first power supply voltage and a reference power supply for generating a bias voltage depending on the first power supply voltage;
   a differential part connected to the self-bias part for amplifying a variation in the bias voltage; and
   a negative feedback part connected to the differential part, the negative feedback part comprising a variable resistor and for outputting a second power supply voltage, for adjusting a level of the second power supply voltage using the variable resistor and for compensating for the amplified variation of the bias voltage through a negative feedback operation,
   wherein the level of the second power supply voltage is maintained at a substantially constant level through the negative feedback operation.

2. The DC stabilization circuit as claimed in claim 1, wherein the self-bias part comprises:
   a first resistor connected to the first power supply voltage; and
   a second resistor connected between the first resistor and the reference power supply for applying the bias voltage to the differential part.

3. A DC stabilization circuit comprising:
   a self-bias part connected between a first power supply voltage and a reference power supply for generating a bias voltage depending on the first power supply voltage;
   a differential part connected to the self-bias part for amplifying a variation in the bias voltage; and
   a negative feedback part connected to the differential part, for adjusting a level of a second power supply voltage using a variable resistor and for compensating for the amplified variation of the bias voltage through a negative feedback operation,
   wherein the self-bias part comprises:
      a first resistor connected to the first power supply voltage; and
      a second resistor connected between the first resistor and the reference power supply for applying the bias voltage to the differential part, and
   wherein the differential part comprises:
      a first transistor for receiving the bias voltage and for generating a small signal current corresponding to the variation in the bias voltage;
      a second transistor for forming a pair together with the first transistor and for receiving the small signal current;
      a third resistor connected between the first power supply voltage and the second transistor for transferring a variation in voltage corresponding to the small signal current to the negative feedback part; and
      a constant current source connected between the reference power supply and a common node to which the first transistor and the second transistor are connected.

4. The DC stabilization circuit as claimed in claim 3, wherein the negative feedback part comprises:
   an emitter follower for receiving the variation in voltage corresponding to the small signal current generated by the third resistor and for transferring the received variation to an output terminal; and
   a voltage converter connected between the emitter follower and the reference power supply, for using the variable resistor to negatively feedback the variation in voltage corresponding to the small signal current to the second transistor.

5. The DC stabilization circuit as claimed in claim 4, wherein the emitter follower comprises:
   a third transistor receiving the variation in voltage corresponding to the small signal current and transferring the received variation to an output terminal; and
   a fourth resistor connected between the first power supply voltage and the third transistor and determining a quiescent operating point of the third transistor.

6. The DC stabilization circuit as claimed in claim 5, wherein the voltage converter comprises:
   a fifth resistor connected to the output terminal of the third transistor, the variable resistor connected to the fifth resistor for supplying a bias voltage to the second transistor; and
   a sixth resistor connected between the variable resistor and the reference power supply.

7. The DC stabilization circuit as claimed in claim 6, wherein the voltage converter further comprises a first diode connected between the output terminal of the third transistor and the fifth resistor for preventing a reverse current from flowing from the variable resistor to the third transistor.

8. The DC stabilization circuit as claimed in claim 7, wherein the voltage converter further comprises a second diode connected between an emitter of the third transistor and the output terminal of the voltage converter for preventing a reverse current from being introduced from the output terminal of the voltage converter.

9. A power supply for an organic electroluminescent display device, comprising:
   a regulator circuit for receiving an input power supply voltage and for outputting a first power supply voltage having a first level; and
   a DC stabilization circuit connected to the regulator circuit, for adjusting the first level of the received first power supply voltage by a negative feedback operation, and for outputting a second power supply voltage having a second level lower than the first level,
   wherein the DC stabilization circuit comprises:
      a self-bias part having a first resistor and a second resistor, which are connected between the first power supply voltage and a reference power supply, for generating a bias voltage depending on the first power supply voltage;
      a differential part connected to the self-bias part for amplifying a variation in the bias voltage; and
      a negative feedback part connected to the differential part, the negative feedback part comprising a variable resistor and for adjusting the second level of the second power supply voltage using the variable resistor, and for compensating for the amplified variation of the bias voltage through a negative feedback operation, wherein the second level of the second power supply voltage is maintained at a substantially constant level through the negative feedback operation.

10. A power supply for an organic electroluminescent display device, comprising:

a regulator circuit for receiving an input power supply voltage and for outputting a first power supply voltage having a first level; and a DC stabilization circuit connected to the regulator circuit, for adjusting the first level of the received first power supply voltage by a negative feedback operation, and for outputting a second power supply voltage having a second level lower than the first level, wherein the DC stabilization circuit comprises:

a self-bias part having a first resistor and a second resistor, which are connected between the first power supply voltage and a reference power supply, for generating a bias voltage depending on the first power supply voltage;

a differential part connected to the self-bias part for amplifying a variation in the bias voltage; and a negative feedback part connected to the differential part, for adjusting the second level of the second power supply voltage using a variable resistor, and for compensating for the amplified variation of the bias voltage through a negative feedback operation, and wherein the differential part comprises:

a first transistor for receiving the bias voltage for generating a small signal current corresponding to the variation in the bias voltage;

a second transistor for forming a pair together with the first transistor and for receiving the small signal current;

a third resistor connected between the first power supply voltage and the second transistor for transferring a variation in voltage corresponding to the small signal current to the negative feedback part; and a constant current source connected between the reference power supply and a common node to which the first transistor and the second transistor are connected.

11. The power supply for an organic electroluminescent display device as claimed in claim 10, wherein the negative feedback part comprises:

an emitter follower for receiving the variation in voltage corresponding to the small signal current generated by the third resistor and for transferring the received variation to an output terminal; and a voltage converter connected between the emitter follower and the reference power supply for using the variable resistor to negatively feedback the variation in voltage corresponding to the small signal current to the second transistor.

12. The power supply for an organic electroluminescent display device as claimed in claim 11, wherein the emitter follower comprises:

a third transistor for receiving the variation in voltage corresponding to the small signal current and for transferring the received variation to the output terminal; and a fourth resistor connected between the first power supply voltage and the third transistor for determining a quiescent operating point of the third transistor.

13. The power supply for an organic electroluminescent display device as claimed in claim 12, wherein the voltage converter comprises:

a fifth resistor connected to the output terminal of the third transistor the variable resistor connected to the fifth resistor for supplying a bias voltage to the second transistor; and a sixth resistor connected between the variable resistor and the reference power supply.

14. The power supply for an organic electroluminescent display device as claimed in claim 13, wherein the voltage converter further comprises a first diode connected between the output terminal of the third transistor and the fifth resistor for preventing a reverse current from flowing from the variable resistor to the third transistor.

15. The power supply for an organic electroluminescent display device as claimed in claim 14, wherein the voltage converter further comprises a second diode connected between an emitter of the third transistor and the output terminal of the voltage converter for preventing a reverse current from being introduced from the output terminal of the voltage converter.

16. An organic electroluminescent display device comprising:

a regulator circuit for receiving an input power supply voltage and for outputting a first power supply voltage having a first level;

a DC stabilization circuit connected to the regulator circuit, for adjusting the first level of the received first power supply voltage by a negative feedback operation, and for outputting a second power supply voltage having a second level lower than the first level; and at least one pixel circuit connected to the DC stabilization circuit for receiving the second power supply voltage, wherein the DC stabilization circuit comprises:

a self-bias part having a first resistor and a second resistor, which are connected between the first power supply voltage and a reference power supply, for generating a bias voltage depending on the first power supply voltage;

a differential part connected to the self-bias part for amplifying a variation in the bias voltage; and a negative feedback part connected to the differential part, the negative feedback part comprising a variable resistor and for adjusting the second level of the second power supply voltage using the variable resistor, and for compensating for the amplified variation of the bias voltage through a negative feedback operation, wherein the second level of the second power supply voltage is maintained at a substantially constant level through the negative feedback operation.

* * * * *